United States Patent
Bertetti et al.

[11] Patent Number: 6,109,794
[45] Date of Patent: Aug. 29, 2000

[54] ROLLING CONTACT BEARING PROVIDED WITH A SEAL AND AN ELECTROSTATIC CURRENT DISCHARGE DEVICE

[75] Inventors: Paolo Bertetti; Angelo Vignotto, both of Turin, Italy

[73] Assignee: SKF Industrie S.p.A., Turin, Italy

[21] Appl. No.: 09/116,532

[22] Filed: Jul. 16, 1998

[30]     Foreign Application Priority Data

Jul. 17, 1997 [IT] Italy ................................. TO97A0648

[51] Int. Cl.[7] .................................................. F16C 19/00
[52] U.S. Cl. ........................ 384/462; 384/476; 384/477; 384/277; 384/482; 277/919; 277/565
[58] Field of Search ................................... 384/477, 476, 384/277, 481, 484, 462, 482; 277/919, 920, 936, 938, 562, 565

[56]            References Cited

U.S. PATENT DOCUMENTS

| | | |
|---|---|---|
| 3,564,477 | 2/1971 | Pompei . |
| 4,502,739 | 3/1985 | Flander ................................... 384/481 |
| 5,139,425 | 8/1992 | Daviet et al. ......................... 384/477 X |
| 5,863,135 | 1/1999 | Bildtsen et al. ......................... 384/477 |

FOREIGN PATENT DOCUMENTS

| | | |
|---|---|---|
| 475 841 | 3/1992 | European Pat. Off. . |
| 0 522 933 | 1/1993 | European Pat. Off. . |
| 607 719 | 7/1994 | European Pat. Off. . |
| 675 364 | 10/1995 | European Pat. Off. . |
| 681 185 | 11/1995 | European Pat. Off. . |
| 726 468 | 8/1996 | European Pat. Off. . |
| 0 875 700 | 11/1998 | European Pat. Off. . |
| 42 31 033 | 8/1993 | Germany . |
| 63-043067 | 2/1988 | Japan . |
| 127647 | 5/1995 | Japan . |

*Primary Examiner*—David A. Bucci
*Assistant Examiner*—Marcus Charles
*Attorney, Agent, or Firm*—Merchant & Gould P.C.

[57]          ABSTRACT

A rolling contact bearing is described with a sealing device suitable to discharge the electrostatic currents which accumulate in a autovehicle; the sealing device (13, 32) has at least one sealing element (17, 37, 43) made of elastic conductive material integral with the stationary race (11) of the bearing and said sealing element engages, by sliding contact, a surface (21, 22, 40, 41, 33) integral with the rotating race (10, 35) of the bearing. The sealing element made of elastic conductive material (17, 37, 43) co-operates with the sealing device (13, 32) to form a hermetically sealed chamber (26, 24, 39, 44); said chamber contains electrically conductive grease and is placed between the outside environment and the bearing inner portions (14) which normally contain lubricant grease.

5 Claims, 6 Drawing Sheets

ROLLING CONTACT BEARING PROVIDED WITH A SEAL AND AN ELECTROSTATIC CURRENT DISCHARGE DEVICE

DESCRIPTION

The present invention refers to a rolling contact bearing unit, particularly for the hub of a vehicle wheel, fitted with at least one sealing device closing the annular gap between the radially outer race and the radially inner race of the bearing and to allow the electrostatic current discharge through the bearing.

PREVIOUS ART DESCRIPTION

It is known that, for various reasons, electrostatic currents accumulate on the auto vehicles; said currents may cause some inconveniences, as for instance the noise which mainly disturbs the AM bands of the radio inside the autovehicle.

It has been tried to overcome this inconvenience by realising an electric bridge between the stationary and the rotating portions of the rolling contact bearings of the hub of the vehicle wheels; the rotating portion, in fact, has the same potential of the wheel.

When the bearing rotates, the lubricating grease within said bearing is distributed so as to cover the rolling elements. Since said lubricating grease has electrically insulating characteristics, it does not allow the creation of an electric connection through the outer race, the rolling elements and the inner race. Some solutions have been proposed, wherein a conductive elastic element is in physical contact with one of the rolling races and is also in sliding contact with the other; U.S. Pat. No. 3,564,477.

Other solutions try to create the electric contact between the bearing races in areas outside the area where the lubricating grease is contained.

The European patent EP-B-0 475841 discloses a bearing having rotating electric contacts, said bearing has, between the outer and the inner rolling races, a conductive cartridge having a substantially annular shape which allows the passage of electric current between a rotating component and a fixed component of the bearing. The cartridge comprises two conductive plates in relative rotation, each plate is integral with one of the bearing rolling races; a conductive element is pressed against one of these plates by means of an elastic conductive element in contact with the other plate.

The Japanese patent application No. JP-A-63 043067 discloses a conductive material with elastic characteristics formed by a mix of two or more types of rubber with the addition of a conductive material with elastic characteristics, suitable to form a seal gasket for bearings.

The above mentioned solutions have a limit in the fact that they realise the passage of electric current exclusively through the physical sliding contact between an elastic conductive material and a conductive surface. If the sliding contact is interrupted due for instance to the gasket wear or to permanent deformations caused by mechanical or thermal factors, the vehicle becomes electrostatically charged. The same inconvenience can happen if the sliding element, as a consequence of an impact, is moved in a position where said element is not any more in contact with the conductive surface wherein said element slides.

SUMMARY OF THE INVENTION

A purpose of the present invention is to realise a bearing provided with a sealing device with improved characteristics for the passage of an electric current. Another purpose of the invention is to allow the discharge of the electrostatic currents even when deformations or displacements of the elastic conductive materials are present, as discussed above.

These and other purposes and advantages, which will be better understood hereinafter, are achieved according to the invention by means of a rolling contact bearing, in particular for the hub of a vehicle wheel, provided with at least one sealing device closing the annular gap between the radially outer race and the radially inner race of the bearing, wherein said sealing device comprises at least one sealing element of a electrically conductive elastic material fast with a first, rotating or stationary element of the bearing and slidingly contacting an electrically conductive surface integral with respect to said first element, so as to allow the passage of electric current between the inner and the outer races of the bearing, characterised in that said elastic, electrically conductive element co-operates with said sealing device so as to form at least one hermetically sealed chamber containing electrically conductive grease, said chamber being interposed between the external environment and the inner parts of the bearing containing lubricating grease.

SHORT DESCRIPTION OF THE DRAWINGS

The structural and functional characteristics of some preferred, non limiting embodiments of the bearing will be described hereinafter according to the invention and according to the attached drawings, in which.

DESCRIPTION OF THE PREFERRED EMBODIMENTS

Figure 1:
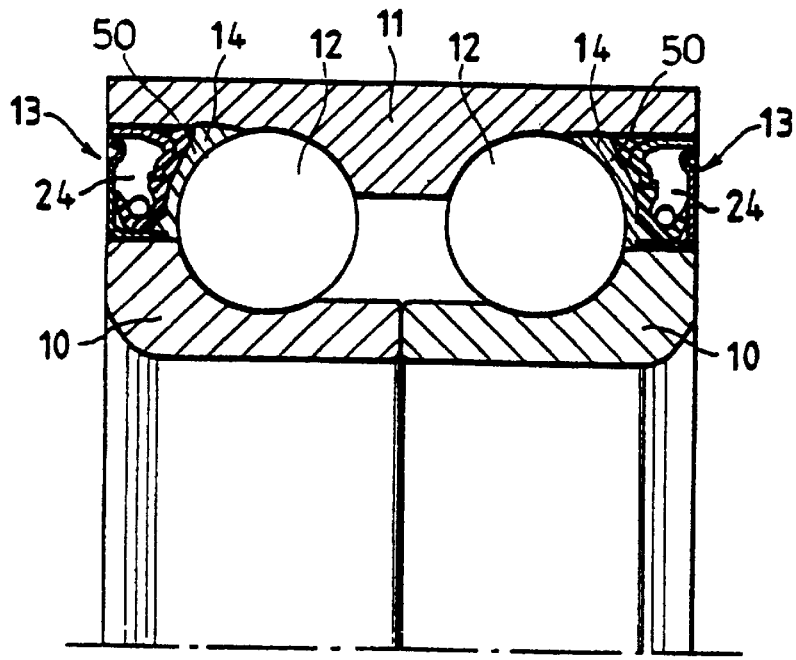
FIG. 1 is a partial axial sectional view of a bearing provided with a sealing device according to the present invention.

With reference to FIG. 1, a rolling contact bearing, in particular for the hub of a vehicle wheel, comprises two inner, generally rotating races 10 and an outer, generally stationary race 11, two series of rolling elements 12 are applied between said races, according to a known arrangement for the angular or oblique contact bearings. At both axial ends of the bearing a sealing device is mounted, said sealing device, indicating by numeral 13, closes the annular gap between the inner races and the outer race and does not allow the outside polluting agents (water, dust, mud) to enter into the inner parts of the bearing, and does not allow the lubricating grease, usually contained inside the inner portion 14 of the bearing, to exit from the bearing. As shown in more details in FIG. 2, the sealing device 13 comprises a first annular insert 15, integral with one of the inner races 10, said first annular insert is also known with the term "flinger", a second annular insert 16, integral with the outer race 11 and a sealing element 17, made of a conductive elastic material as for instance conductive cured rubber, said sealing element is integral with the second annular insert 16 and is in sliding contact with the first annular insert 15.

The end portion 18 of the element 17 made of conductive rubber has a V shaped axial section and defines two sealing lips 19 and 20 respectively in contact with a cylindrical wall 21 and a radial wall 22 of the first insert 15.

Figure 2:
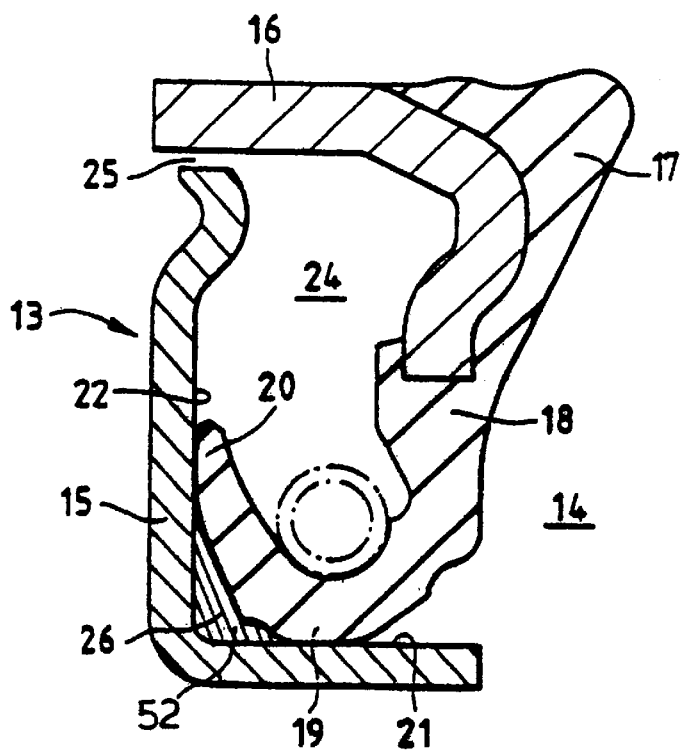
FIG. 2 is an enlarged scaled view of the sealing device of FIG. 1.

As it is clearly shown in FIG. 2, the configuration of the sealing device 13 is such that the component elements define a first annular outer chamber 24, with an opening 25 to the outside and a second hermetically sealed inner chamber 26.

This second chamber 26 is defined by a portion of the sealing element 17, said portion being comprised between the two contact lips 19 and 20, and by the corresponding portion of the fist insert 15. In the preferred embodiment shown in FIGS. 1 and 2, the chamber 26 has an axial substantially triangular shape, since said chamber is defined by two perpendicular walls belonging to the insert 15, and by a substantially straight length 18 of the elastic sealing element, the shape of this second inner chamber may nontheless change according to the design of the elements defining the sealing device.

According to the present invention, the hermetically sealed chamber 26 contains a conductive grease 52 which improves the electric conductivity of the sealing device in order to discharge therethrough the above discussed electrostatic currents. Since the chamber 26 is hermetically sealed, the conductive grease 52 therein contained can neither be mixed with the lubricating grease 50 contained in the chamber 14 together with the rolling element nor pass into the first chamber 24 which is connected to the external environment.

Figure 3:
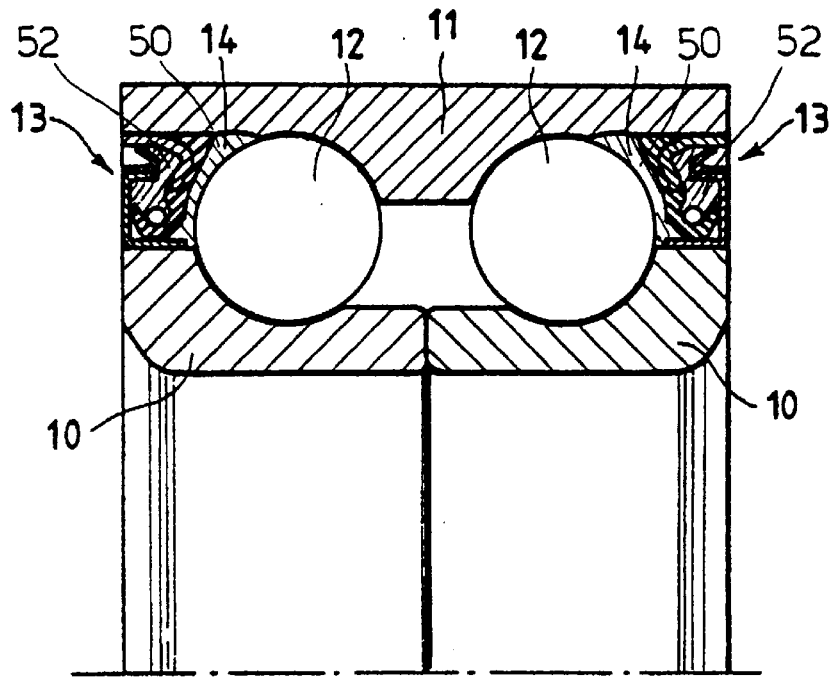
FIG. 3 is a partial axial sectional view of a bearing provided with a different type of sealing device according to the present invention.
Figure 4:
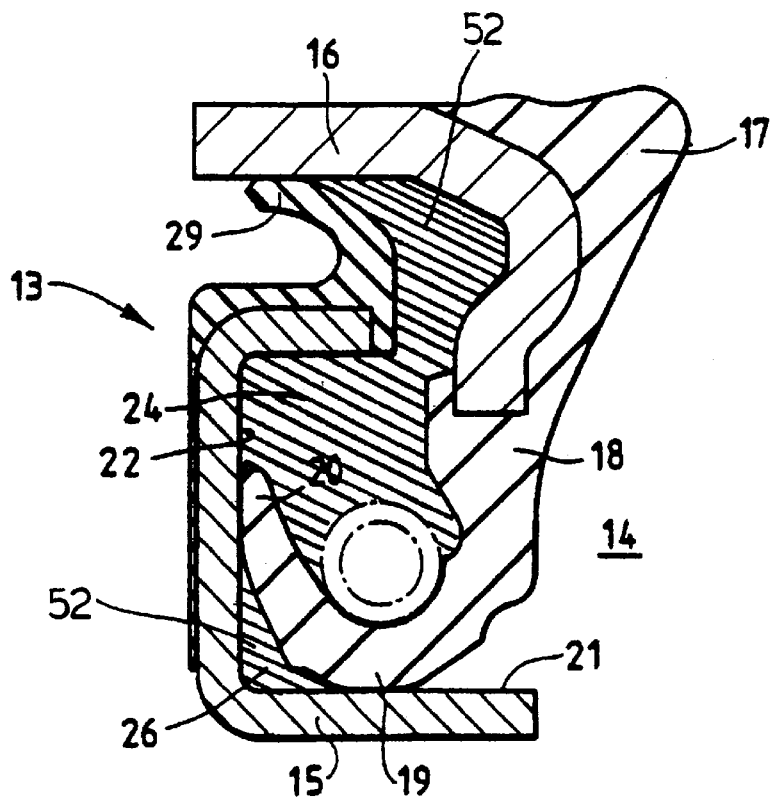
FIG. 4 is an enlarged scaled view of the sealing device of FIG. 3.

The conductive grease 52 contained into the hermetically sealed chamber 26 is preferably made of a polymeric grease containing a minimum percentage (1–2%) of antistatic material (for instance the Dehydat 51, commercialised by Henkel) and/or solid conductive particles, for instance niobium sulphide and carbon with 1–2 $\mu$m dimensions. Referring now to FIGS. 3 and 4, an alternative embodiment of the present invention discloses a sealing device which forms two adjacent hermetically sealed chamber, and at least one of said chambers contains conductive grease 52. As shown in details in FIG. 4, the first sealing insert 15 carries its own sealing element 29, preferably made of a conductive elastic material as for instance conductive rubbers or elastomers, said material is slidingly in contact with the second annular insert 16 thus causing also the outer chamber 24 to become hermetically sealed. Referring to the example of FIGS. 3 and 4, at least one of the two elastic sealing elements is a conductive element, and, anyhow, it is preferable that at least the stationary sealing element 17, which is integral with the stationary outer race of bearing, is made of a conductive material. It should be noted that in case that the rotating element is the outer race, then the conductive material sealing element shall be the element 29 which is integral with the inner race 10. In fact, the rotating element 29 is affected by the centrifugal force which pushes said element against the insert 16, whereon said rotating element slides. An increase in the contact pressure could in fact cause a quicker wear of the conductive rubber and/or form a permanent deformation which could, with the passing of time, cause the loss of contact between the elastic rotating element and the corresponding insert, thus interrupting the passage of the electric current therethrough. On the other hand, the contact pressure of the stationary elastic element 17 is constant and is not affected by the centrifugal force, therefore its sealing characteristics are more reliable.

Figure 5:
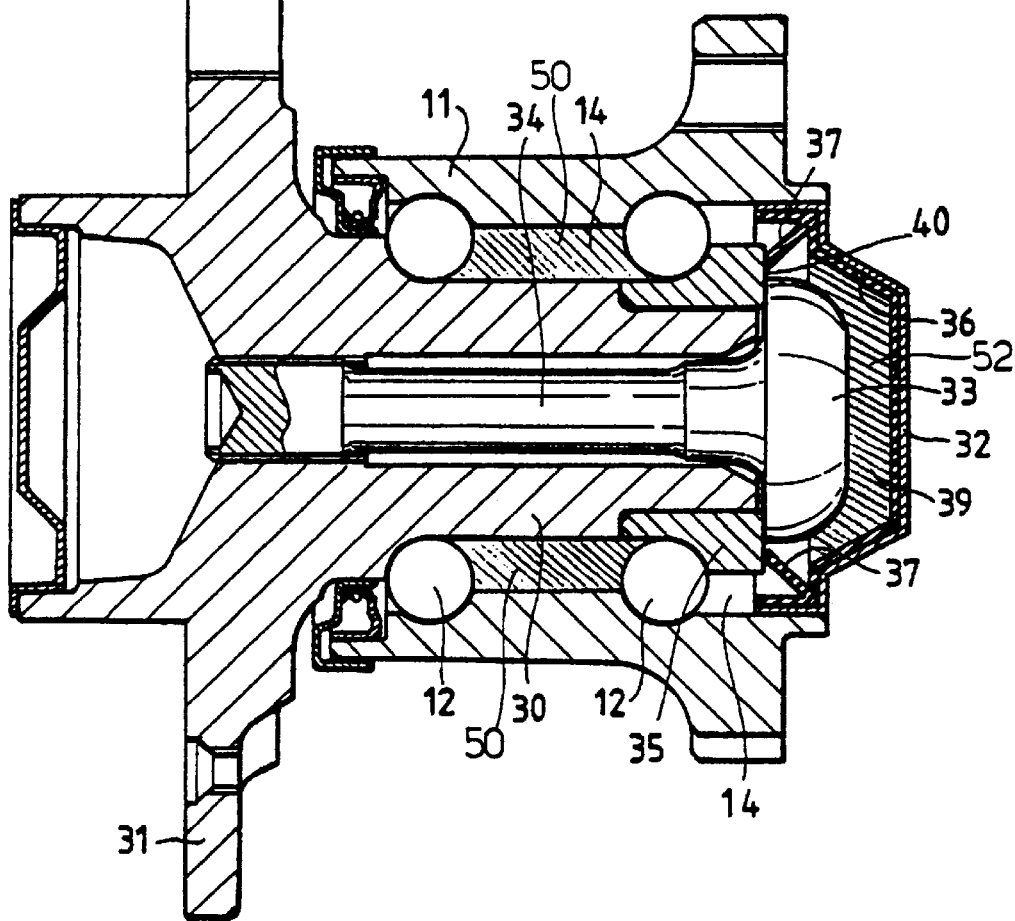
FIGS. 5–12 are partial axial sectional views of additional alternative embodiments of the invention.

Referring now to FIG. 5, another embodiment of the invention is shown, wherein said embodiment refers to a bearing for the hub 30 of a vehicle wheel; the hub 30 forms one of the inner rolling races of the bearing and also forms a flange 31 for the fixing to one of the wheels (no shown) of the autovehicle.

The outer race 11 is closed, at its end facing the inner side of the vehicle, by a concave cover 32 made of metallic sheet, said cover is inserted inside the diameter at the end of said race; the cover 31 has its concave side facing the head 33 of a bolt 34 suitable to block axially, against the hub 30, a separate race 35, which forms the inner rolling race for the series of the axially inner rolling elements 12. According to a feature of the present invention, at least a portion of the concave or inner surface of the cover 32 is coated with conductive rubber 36 and further forms at least a conical lip 37 which slidingly contacts a conductive rotating element which is integral with the hub in order to realise a conductive bridge between the rotating portion and the stationary portion of the bearing; at the same time the conical lip 37 hermetically separates the inner chamber 14 of the bearing, whereinto there is the lubricating grease 50, from the conductive hermetically sealed chamber 39, which contains conductive grease 52 and which is defined by the central portion of the cover 32 having the coating 36, from the conical conductive lip 37 and from the rotating parts surface which is surrounded by the conical lip 37. In the example of FIG. 5, the conical lip 37 is, advantageously, in contact with the front radial wall 40 of the inner race 35 which has a low surface roughness and which therefore does not wear the conical lip.

Figure 6:
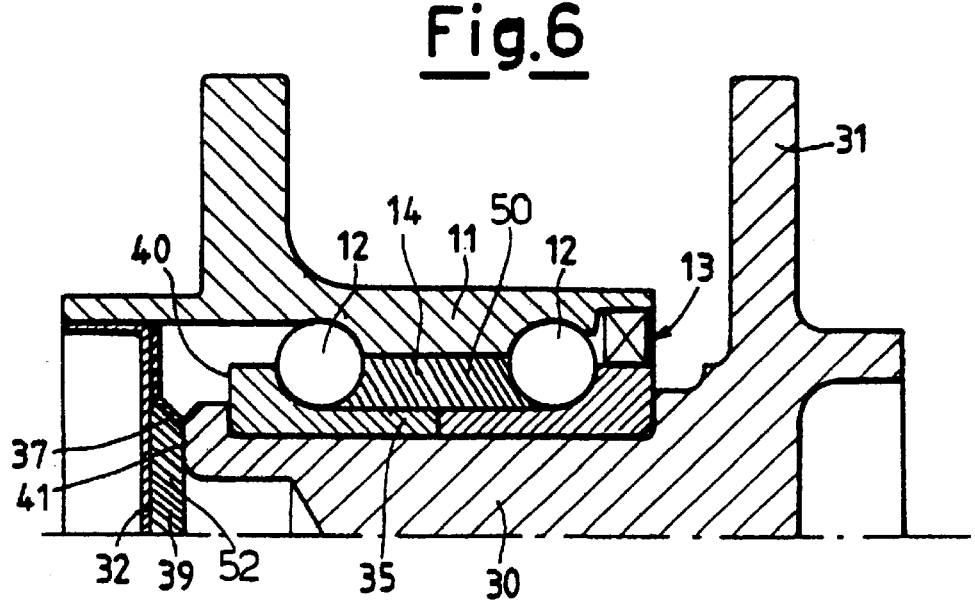

In the example of FIG. 6, the axially inner end 41 of the hub 30 is rolled in order to block the inner race 35; this embodiment is different from the one of FIG. 5 since the conical lip 37 in FIG. 6 is slidingly in contact with the rolled end 41 of the hub.

Figure 7:
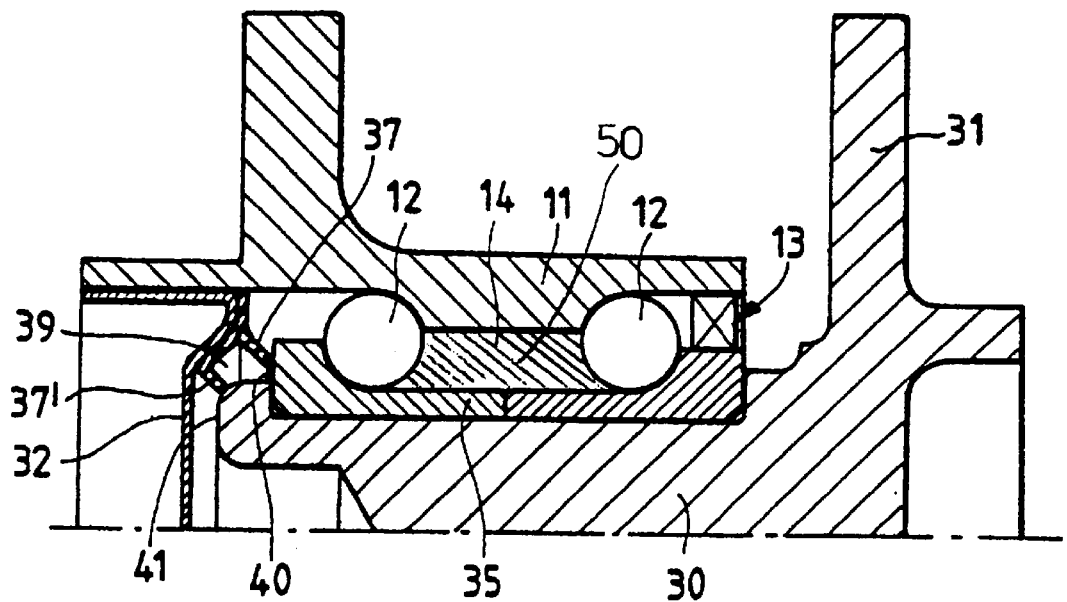

FIG. 7 shows a different embodiment, wherein the elastic sealing element is formed by a couple of conical lips 37, 37' which slide respectively on the front radial wall 40 of the inner race 35 and on the rolled end 41 of the hub 30. In this case the conductive grease 52 is contained inside the annular chamber 39 defined by the lips 37, 37' and by those portions of the sliding surfaces 40 and 41 comprised between said lips.

Figure 8:
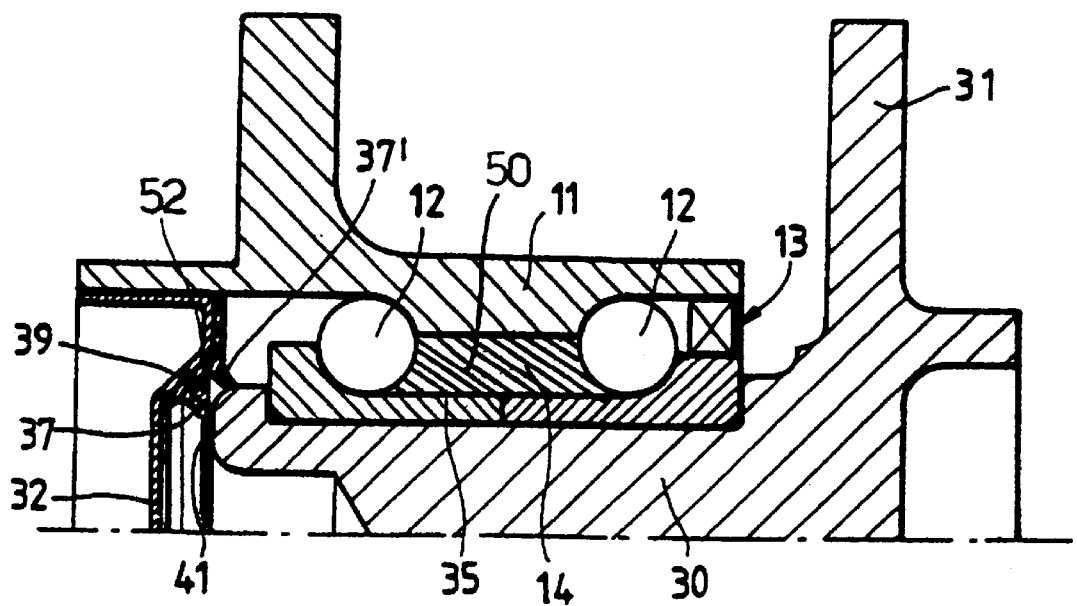
Figure 9:
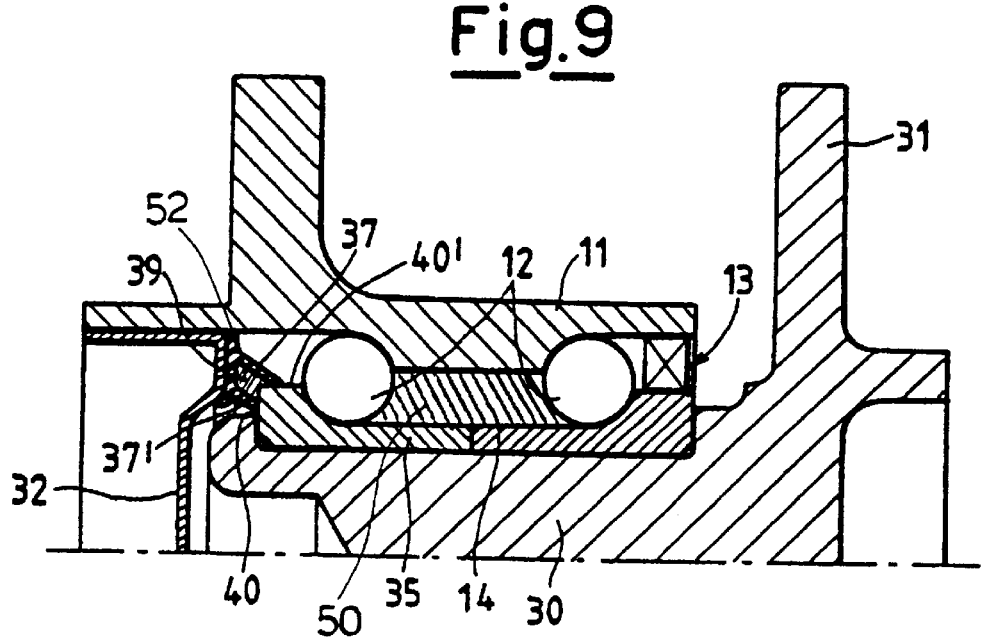

In FIG. 8, a further embodiment is shown, wherein the couple of lips 37, 37' slides against the rolled surface 41 at the end of the hub. In the embodiments of FIG. 9, on the other hand, both lips 37, 37' slide against the inner race 35 and respectively on the front wall 40 and on the cylindrical surface 40' of said inner race. Also in these two embodiments, the annular chamber 39 contains conductive grease 52.

Figure 10:
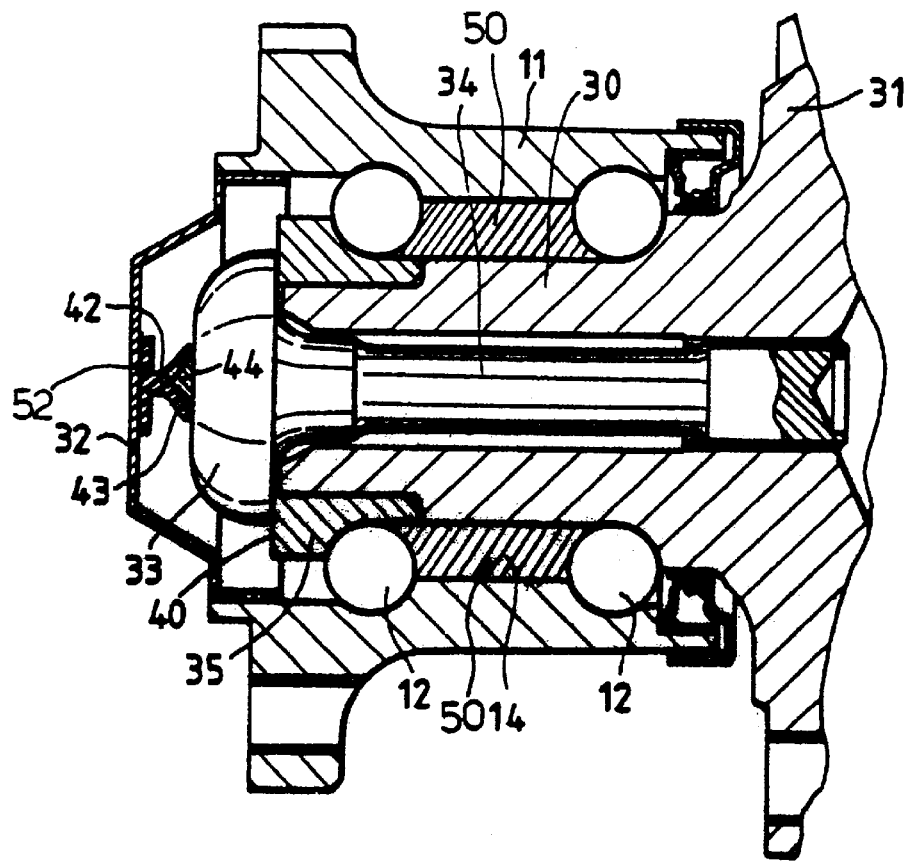

In another different embodiment, shown in FIG. 10, a conductive rubber element 42 is fixed on the concave surface, facing the hub 30, 32, corresponding with the rolling axis of the bearing, said conductive rubber element forms a sucker projection 43 which slidingly contacts the head 33 of the locking bolt 34.

Figure 11:
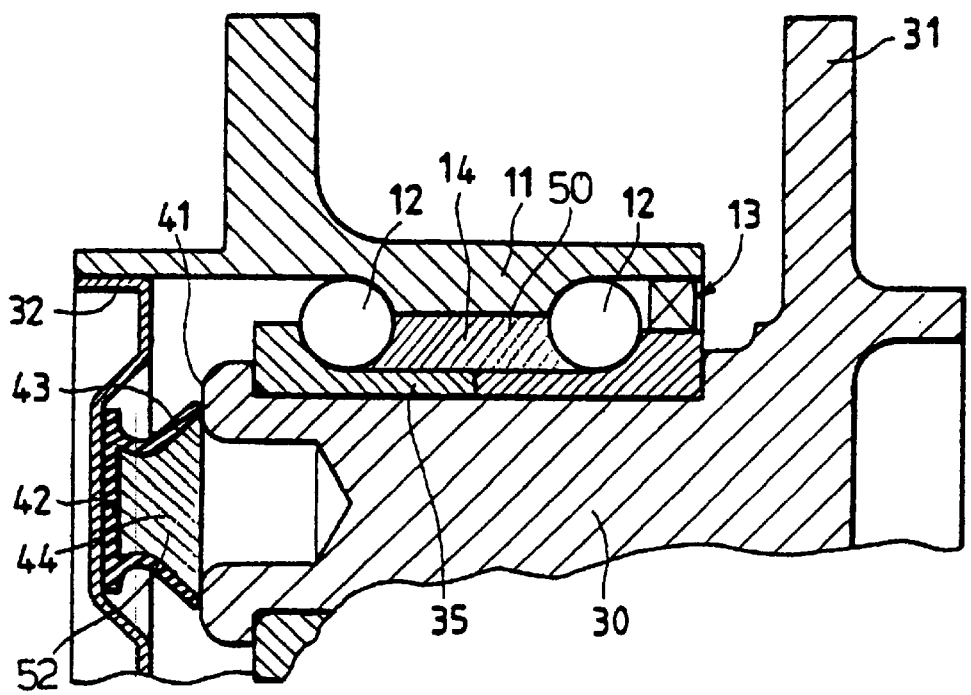

In this embodiments, the conductive grease 52 containing chamber is the chamber 44 comprised between the bolt head and the sucker projection 43. Since in this case the electric bridge between the inner race and the outer race of the bearing is realised in proximity of the rotations axis, where the tangential component of the relative rotation speed is very low, the wear of the portion made of conductive rubber will be extremely low. Another embodiment, similar to the one of FIG. 10 is shown in FIG. 11, wherein the conductive rubber element 42 forms a sucker projection 43 which slidingly contacts the rolled end 41 of the hub 30.

Figure 12:
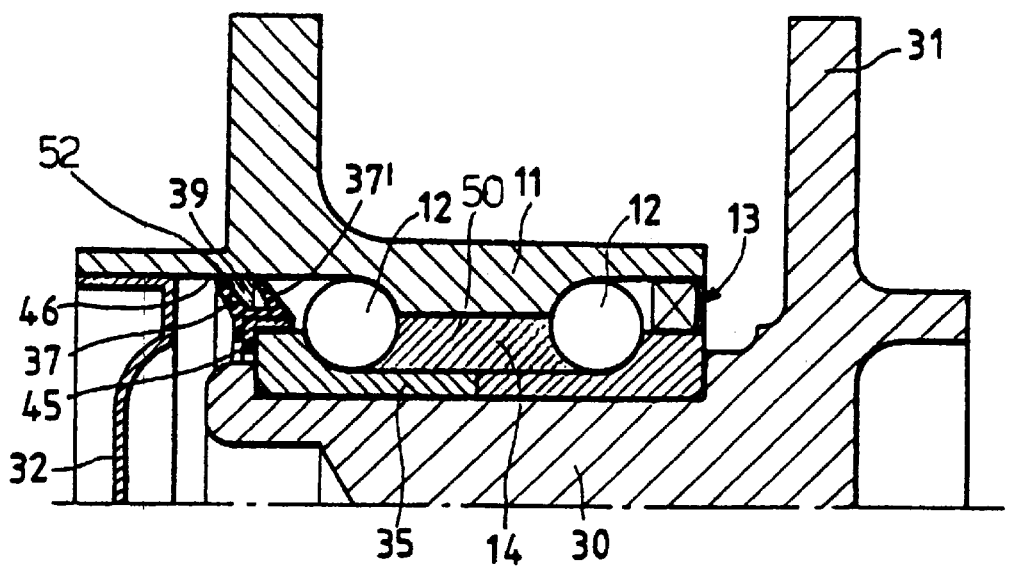

Finally, referring to FIG. 12, according to another embodiment of the invention, the elastic sealing element is formed by a couple of conical lips 37, 37' made of a conductive elastic material cured on an annular metallic insert 45 which is integral with a inner race 35. The lips 37, 37' slide against the inner cylindrical surface 46 of the outer rolling race 11, thus defining together with said outer race, an annular chamber 39, containing conductive grease 52.

What is claimed is:

1. A rolling contact bearing unit for a vehicle wheel, fitted with at least one sealing device closing an annular gap formed between a radially outer race and a radially inner race of the bearing, wherein said sealing device comprises at least one sealing element of an electrically conductive elastic material fast with a first, rotating or stationary element of the bearing and slidingly contacting an electrically conductive surface integral with a second element of the bearing in relative rotation with respect to said first element, so as to allow the passage of electric current between the radially inner and the radially outer races of the bearing, wherein, said sealing element of an electrically conductive elastic material co-operates with said sealing device so as to form at least one hermetically sealed chamber containing electrically conductive grease, said chamber being interposed between the external environment and inner parts of the bearing containing lubricating grease.

2. A bearing unit as claimed in claim 1, wherein, said hermetically sealed chamber is defined by two wall portions of a first insert of the sealing device, said walls forming an angle therebetween, and a length of the elastic sealing element of an electrically conductive elastic material integral with a second insert rotating relative to said first insert and forming two lips sliding against said two wall portions, respectively.

3. A bearing unit as claimed in claim 1, wherein, said hermetically sealed chamber is defined by a first insert carrying a first elastic sealing element, and a second insert carrying a second elastic sealing element having one or more sliding lips, wherein said first and second inserts are respectively fast for rotation with a rotating element and a stationary element of the bearing, said first and second elastic sealing elements respectively sliding against said second and first inserts.

4. A bearing unit as claimed in claim 1, further comprising two hermetically sealed adjacent chambers, of which a first, inner hermetically sealed chamber is defined by two wall portions of a first insert of the sealing device, said walls forming an angle therebetween, and a length of a first elastic sealing element integral with a second insert rotating relative to said first insert and forming two lips sliding against said two wall portions, respectively; and the second insert carrying a second elastic sealing element, wherein said first and second inserts are respectively fast for rotation with a rotating element and a stationary element of the bearing, said first and second elastic sealing elements respectively sliding against said second and first inserts.

5. A bearing unit as claimed in claim 3, wherein, at least the first or second elastic sealing element is made of elastically conductive material.

* * * * *